United States Patent
Kim (10) Patent No.: US 10,370,031 B2
(45) Date of Patent: Aug. 6, 2019

(54) ASSISTANT SYSTEM AND ASSISTANT METHOD FOR BACKWARD DRIVING OF VEHICLE

(71) Applicant: HYUNDAI MOBIS CO., LTD., Seoul (KR)

(72) Inventor: Jeong Ku Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 77 days.

(21) Appl. No.: 15/370,474

(22) Filed: Dec. 6, 2016

(65) Prior Publication Data
US 2017/0158236 A1    Jun. 8, 2017

(30) Foreign Application Priority Data
Dec. 8, 2015    (KR) .................. 10-2015-0173813

(51) Int. Cl.
| | | |
|---|---|---|
| B62D 15/00 | (2006.01) | |
| B62D 15/02 | (2006.01) | |
| B60R 1/00 | (2006.01) | |
| B62D 6/00 | (2006.01) | |
| B62D 6/10 | (2006.01) | |
| G05D 1/02 | (2006.01) | |
| G08G 1/16 | (2006.01) | |

(52) U.S. Cl.
CPC .............. B62D 15/025 (2013.01); B60R 1/00 (2013.01); B62D 6/003 (2013.01); B62D 6/10 (2013.01); B62D 15/0285 (2013.01); G05D 1/0219 (2013.01); G05D 1/0238 (2013.01); G08G 1/16 (2013.01); *B60R 2300/105* (2013.01); *B60R 2300/8086* (2013.01); *G05D 2201/0213* (2013.01)

(58) Field of Classification Search
CPC combination set(s) only.
See application file for complete search history.

(56) References Cited

U.S. PATENT DOCUMENTS 9,598,106 B2 *   3/2017   Sobue ................ B62D 15/0275
9,862,413 B2 *   1/2018   Laine ................. B62D 15/0285
(Continued)

FOREIGN PATENT DOCUMENTS

| KR | 10-2014-0083783 | 7/2014 |
|---|---|---|
| KR | 10-2015-0077823 | 7/2015 |

*Primary Examiner* — Adam D Tissot
*Assistant Examiner* — Edward J Pipala
(74) *Attorney, Agent, or Firm* — H.C. Park & Associates, PLC (57) ABSTRACT

Provided are an assistant system and assistant method for a backward driving of a vehicle, wherein the assistant system includes an input unit configured to receive a backward driving assistant command, a position tracking unit configured to track real-time positions of the vehicle, an obstacle sensing unit configured to generate an obstacle sensing signal, a steering device manipulation unit configured to adjust a steering angle of a steering device of the vehicle, a primary backward path generation unit configured to generate a primary backward path, a secondary backward path generation unit configured to generate a secondary backward path for the vehicle to drive backward, and a control unit configured to match the real-time positions of the vehicle to the secondary backward path, and at the time of a backward driving, to control the steering device manipulation unit.

11 Claims, 3 Drawing Sheets

(56) References Cited

U.S. PATENT DOCUMENTS

| | | | | |
|---|---|---|---|---|
| 2001/0026317 A1* | 10/2001 | Kakinami | ............... | B60Q 9/005 |
| | | | | 348/148 |
| 2007/0132563 A1* | 6/2007 | Balbale | .................. | B60Q 9/004 |
| | | | | 340/435 |
| 2008/0266137 A1* | 10/2008 | Son | ..................... | B62D 15/0275 |
| | | | | 340/932.2 |
| 2010/0283632 A1* | 11/2010 | Kawabata | ............. | B62D 15/027 |
| | | | | 340/932.2 |
| 2013/0096816 A1* | 4/2013 | Takano | .............. | B62D 15/0265 |
| | | | | 701/400 |
| 2014/0222288 A1* | 8/2014 | Lavoie | .................... | G06F 17/00 |
| | | | | 701/41 |
| 2015/0012202 A1* | 1/2015 | Moore | .................. | B60W 10/06 |
| | | | | 701/93 |
| 2017/0015312 A1* | 1/2017 | Latotzki | ................. | B60W 30/06 |
| 2017/0029028 A1* | 2/2017 | Kiyokawa | ........... | B62D 15/0285 |

* cited by examiner

ASSISTANT SYSTEM AND ASSISTANT METHOD FOR BACKWARD DRIVING OF VEHICLE

CROSS-REFERENCE TO RELATED APPLICATION

This application claims priority from and the benefit of Korean Patent Application No. 10-2015-0173813, filed on Dec. 8, 2015, the disclosure of which is incorporated herein by reference in its entirety.

BACKGROUND

Field

The present invention relates to an assistant system and assistant method for a backward driving of a vehicle, and more particularly, to an assistant system and assistant method for a backward driving of a vehicle by which steering is controlled such that a vehicle drives while safely avoiding an obstacle behind the vehicle without being deviated from a backward path at the time of a backward driving by generating the backward path using real-time position information of the vehicle and an obstacle sensing signal.

Discussion of the Background

In general, many drivers find driving difficulties at the time of a backward driving. This is because a backward driving and a forward driving of a vehicle have different movement traces from each other, and in the backward driving, a driver need to control steering while directly checking various factors, such as a rear mirror, side mirrors, and a rearview camera, to check a backward path and obstacles.

For example, when there is a need to drive backward through a route of a road which is narrow or a route of a road at lateral side of which other vehicles are parked or stopped, the driver need to directly determine whether the vehicle is able to drive backward by checking a gap between the vehicle and an obstacle, such as the other vehicles parked or stopped at the road, and then drive backward while avoiding the obstacles. While avoiding the obstacles, the driver also need to be careful not to make the vehicle biased to one side of the backward path, so the driver's proficiency and special care are required.

Accordingly, there has been development on an assistant system for a backward driving enabling a driver to safely and comfortably drive backward.

In this regard, "an assistant system for backward driving of a vehicle" disclosed in Korean Patent Laid-open Publication No. 10-2014-0083783 (publication date: Jul. 4, 2014) is directed to a technology for generating a backward path such that a vehicle drives backward while avoiding an obstacle behind the vehicle on the basis of an obstacle sensing signal related to obstacles existing in front and rear of the vehicle.

The assistant system for backward driving of a vehicle may be usefully applied to when a road has a narrow width, but sine it generates a backward path only based on the obstacle sensing signal, in the case of a road having a great width, the vehicle may be excessively biased to a left or right side of the backward path depending on a posture direction of a car body until an obstacle is sensed.

Meanwhile, "an auto backing route control system for vehicle" disclosed in Korean Patent Laid-open Publication No. 10-2015-0077823 (publication date: Jul. 8, 2015) is directed to a technology in which when a vehicle need to drive backward along the same path as an immediately previous path, a previous drive trace (an immediately previous forward path) recorded by using a vehicle speed sensor and a steering angle sensor is estimated and a backward path is controlled to be the same as a forward driving path made just before a backward driving.

In particular, in a drive trace storage unit of the auto backing route control system, a plurality of pieces of drive trace data having been generated at the time of a forward driving immediately until a backward driving are sequentially stored at gaps of a predetermined distance, and a control unit obtains the drive trace data in an order reverse to the order in which the plurality of pieces of drive trace data are stored in the drive trace storage unit at the time of the forward driving. However, since the forward driving and the backward driving have different turning radius due to the construction of the vehicle, the control of the backward path, which is made by only using a vehicle speed sensor and a steering angle sensor to be the same as the forward driving path, may produce a high error rate.

SUMMARY

The present invention is directed to technology for an assistant system and assistant method for a backward driving of a vehicle, by which steering is controlled such that a vehicle drives while safely avoiding an obstacle behind the vehicle without being deviated from a backward path at the time of a backward driving by generating the backward path using real-time position information of the vehicle and an obstacle sensing signal.

The technical objectives of the inventive concept are not limited to the above disclosure; other objectives may become apparent to those of ordinary skill in the art based on the following descriptions.

To achieve the above-described objectives, according to an aspect of the present invention, there is provided an assistant system for a backward driving of a vehicle, the assistant system including an input unit, a position tracking unit, an obstacle sensing unit, a steering device manipulation unit, a primary backward path generation unit, a secondary backward path generation unit, and a control unit. The input unit is configured to receive a backward driving assistant command. The position tracking unit is configured to track real-time positions of the vehicle. The obstacle sensing unit is configured to generate an obstacle sensing signal by sensing an obstacle existing at front, rear, left and right sides of the vehicle. The steering device manipulation unit is configured to adjust a steering angle of a steering device of the vehicle. The primary backward path generation unit is configured to generate a primary backward path based on the real-time positions of the vehicle on map information that is previously stored. The secondary backward path generation unit is configured to generate a secondary backward path for the vehicle to drive backward while avoiding the obstacle behind the vehicle within the primary backward path on the basis of the obstacle sensing signal. The control unit is configured to match the real-time positions of the vehicle to the secondary backward path, and at the time of a backward driving, to control the steering device manipulation unit according to the secondary backward path which matched the real-time positions of the vehicle.

The assistant system may further include a drive trace storage unit configured to store a movement trace according to the real-time positions of the vehicle, wherein in the generation of the primary backward path, the primary backward path generation unit may generate the primary backward path based on spatial coordinates corresponding to a movement trace in a forward direction.

When a wheel mark left on a road by a vehicle passing the road is present, the obstacle sensing unit may further generate a wheel mark sensing signal by sensing the wheel mark, and the secondary backward path generation unit may generate the secondary backward path based on the obstacle sensing signal and the wheel mark sensing signal.

The assistant system may further include a vehicle internal information detection unit configured to detect vehicle internal information including turning direction information of a vehicle body with respect to a driving direction, steering angle information, and rotation speed information of a wheel, wherein, in the control of the steering device manipulation unit according to the secondary backward path, the control unit may control the steering device manipulation unit such that a steering angle of the steering device is adjusted to correspond to a dynamic movement occurring at the time of a backward driving of the vehicle using the vehicle internal information.

When the backward driving assistant command is input through the input unit, the control unit may be configured to, before controlling the steering device manipulation unit, determine whether the vehicle satisfies a vehicle state criterion for performing a backward operation and determine whether the vehicle allows the backward driving to be performed based on the obstacle sensing signal.

The secondary backward path generation unit may update the secondary backward path at equal intervals.

The assistant system may further include an output unit configured to output at least one of information indicating whether the vehicle state criterion is satisfied, information indicating whether the backward driving is performable, obstacle sensing signal information, and driver guidance information.

The obstacle sensing unit may include an image collecting unit configured to obtain image information about front and rear sides of the vehicle, and a sensing unit configured to sense position information of an obstacle from front, rear, left and right sides of the vehicle.

The control unit may determine whether the vehicle allows a backward driving to be performed by detecting obstacles existing at left and right sides of the vehicle with respect to a backward driving direction of the vehicle on the basis of the image information and position information, and comparing a minimum lateral gap between the obstacles with a crosswise width of the vehicle.

According to another aspect of the present invention, there is provided an assistant method of a backward driving of a vehicle, the assistant method including: receiving a backward driving assistant command; determining whether a vehicle satisfies a vehicle state criterion for performing a backward operation; determining whether the vehicle allows a backward driving to be performed based on an obstacle sensing signal; generating a primary backward path based on real-time positions of the vehicle on map information that is previously stored; generating a secondary backward path based on the obstacle sensing signal to drive backward while avoiding an obstacle behind the vehicle within the primary backward path; matching the real-time positions of the vehicle to the secondary backward path; and controlling a steering angle of a steering device by manipulating a steering device manipulation unit at the time of the backward driving according to the secondary backward path which matched the real-time positions of the vehicle.

The determining of whether a vehicle satisfies a vehicle state criterion may include determining whether the vehicle state criterion is satisfied when the vehicle is stopped by a brake manipulation of a driver under the condition that a shift lever is in a position of a reverse gear.

The determining of whether the vehicle allows a backward driving to be performed based on an obstacle sensing signal may include determining whether the vehicle allows a backward driving to be performed by detecting obstacles existing at left and right sides of the vehicle with respect to a backward driving direction of the vehicle on the basis of image information and position information of the obstacle sensing signal, and comparing a minimum lateral gap between the obstacles with a crosswise width of the vehicle.

The generating of the secondary backward path based on the obstacle sensing signal may include updating the secondary backward path periodically or at equal intervals according to an obstacle sensing signal that is newly sensed at the time of a backward driving of the vehicle.

The controlling of the steering angle of the steering device may include controlling the steering device manipulation unit so that the steering angle of the steering device is adjusted to suit a reverse speed of the vehicle using vehicle internal information including turning direction information of a vehicle body with respect to a backward driving direction, steering angle information, and rotation speed information of a wheel.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The above objects, other advantages, and a scheme for the advantages of the present invention should become readily apparent by reference to the following detailed description when considered in conjunction with the accompanying drawings. However, the scope of the present invention is not limited to such embodiments and the present invention may be realized in various forms. The embodiments to be described below are merely exemplary embodiments provided to fully disclose the present invention and assist those skilled in the art to completely understand the present invention, and the present invention is defined only by the scope of the appended claims. The terminology used herein is for the purpose of describing particular embodiments only and is not intended to be limiting of the disclosure. As used herein, the singular forms "a," "an" and "the" are intended to include the plural forms as well, unless the context clearly indicates otherwise. It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Figure 1:
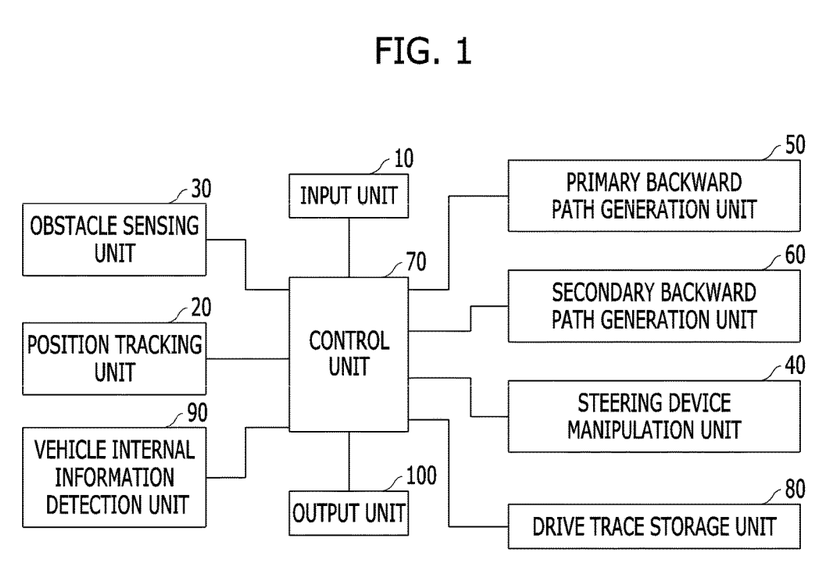
FIG. 1 is a block diagram illustrating a configuration of an assistant system for a backward driving of a vehicle according to an embodiment of the present invention.
Figure 2:
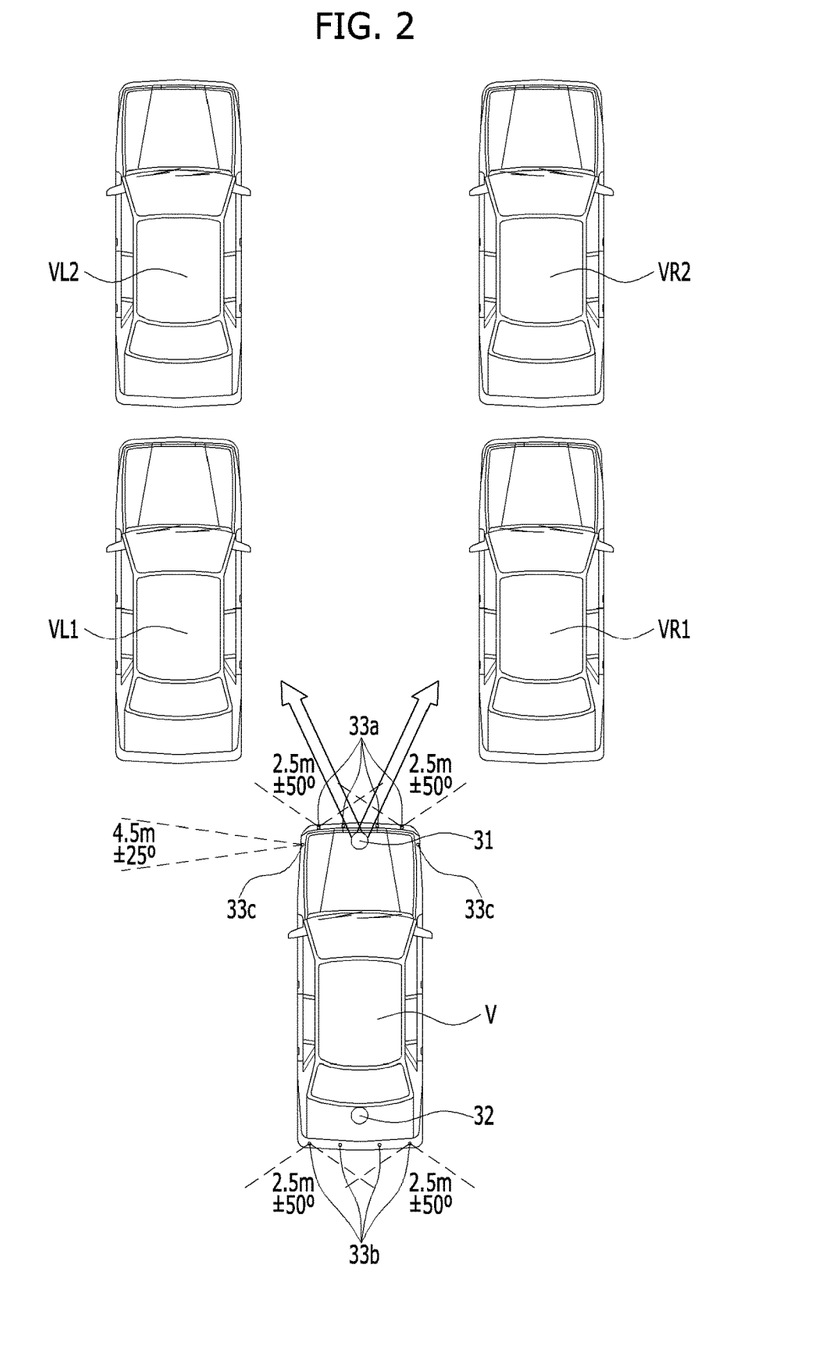
FIG. 2 is an exemplary diagram of a configuration of an obstacle sensing unit according to the present invention.

Hereinafter, an assistant system for a backward driving of a vehicle according to the present invention will be described with reference to FIGS. 1 and 2. FIG. 1 is a block diagram illustrating a configuration of an assistant system for a backward driving of a vehicle according to an embodiment of the present invention, and FIG. 2 is an exemplary diagram of a configuration of an obstacle sensing unit according to the present invention.

As shown in FIG. 1, the assistant system for a backward driving of a vehicle according to the embodiment of the present invention includes an input unit 10, a position tracking unit 20, an obstacle sensing unit 30, a steering device manipulation unit 40, a primary backward path generation unit 50, a secondary backward path generation unit 60, and a control unit 70.

The assistant system for a backward driving of a vehicle includes at least one processor configured to execute functions and a memory configured to store information needed for executing functions and a result of the execution.

The input unit 10 is an element configured to receive a backward driving assistant command. For example, the input unit 10 may be implemented in the form of a switch provided in a vehicle to receive a backward driving assistant command signal or a backward driving assistant cancellation signal input by a driver.

The position tracking unit 20 is an element configured to track real-time positions of the vehicle. The position tracking unit 20 may track the real-time positions of the vehicle using a GPS receiver or a mobile communication network-based position recognition system.

The obstacle sensing unit 30 is an element configured to generate an obstacle sensing signal by sensing obstacles existing at front, rear, and left and right sides of the vehicle. The obstacle sensing unit 30 may include an image collecting unit configured to obtain image information about front and rear sides of the vehicle, and a sensing unit (a distance measurement sensor) configured to sense position information of obstacles from front, rear, left, and right sides of the vehicle.

In this case, the image collecting unit may include a camera installed at a front side and a rear side of the vehicle. The sensing unit may include a lidar sensor, a radar sensor, an ultrasonic sensor, etc.

For example, as shown in FIG. 2, the obstacle sensing unit 30 may include one front camera 31, one rear camera 32, four front ultrasonic sensors 33a, four rear ultrasonic sensors 33b, and two lateral side ultrasonic sensors 33c.

In this case, the front ultrasonic sensor 33a and the rear ultrasonic sensor 33b each may have a detection range of about '2.5 m±50° '. The lateral side ultrasonic sensor 33c may have a detection range of about '4.5 m±25° '. Meanwhile, the number of elements of the obstacle sensing unit 30 may vary depending on the specification of a vehicle v and a system to which the present invention is applied.

The obstacles may represent all objects existing on a road that may cause a collision accident during movement of a vehicle, for example, a vehicle, an electric pole, a trash bin, a wall of a building, a pedestrian, an animal, and so on.

The steering device manipulation unit 40 is an element configured to adjust a steering angle of a steering device of a vehicle. The steering device manipulation unit 40 represents a device configured to, when receiving an assistant command for a backward driving, automatically adjust a steering angle of a steering wheel, that is, a steering device, according to a control of the control unit 70. For example, the steering device manipulation unit 40 may be implemented as a motor driving power steering (MDPS).

The primary backward path generation unit 50 generates a primary backward path based on real-time positions of the vehicle on map information that is previously stored, when an assistant command signal for a backward driving is input into the input unit 10 by the driver.

To this end, the primary backward path generation unit 50 includes map information. Alternatively, the primary backward path generation unit 50 may additionally include a storage unit (not shown) in which the map information is stored, and allow the primary backward path generation unit 50 to use the map information according to the control of the control unit 70.

The secondary backward path generation unit 60 generates a secondary backward path for the vehicle to drive backward while avoiding an obstacle behind the vehicle within the primary backward path on the basis of the obstacle sensing signal.

In this case, the secondary backward path generation unit 60 generates a backward path up to a point corresponding to a detectable distance within which an obstacle is detectable by the obstacle sensing unit 30 as the secondary backward path. That is, the secondary backward path is a specific backward path existing within a primary backward path, and represents a path enabling a backward driving by adjusting a steering angle of a steering device.

In addition, the secondary backward path generation unit 60 periodically updates the secondary backward path according to an obstacle sensing signal newly sensed at the time of a backward driving of the vehicle. For example, the secondary backward path generation unit 60 may determine a distance between the vehicle and each obstacle using image information about a rear side view and position information of the obstacle of the obstacle sensing signal, and generate the secondary backward path for the vehicle to drive while avoiding each obstacle or while passing between obstacles on the basis of the distance between the obstacle and the vehicle.

According to a preferred embodiment of the present invention, the secondary backward path generation unit 60 may generate a plurality of secondary backward paths within a primary backward path, and the secondary backward path may be determined by a selection of a driver.

That is, the plurality of secondary backward paths are displayed on a display of an output unit, and a selection input unit (not shown) may be additionally provided so that one of the secondary backward paths is selected by a driver. In addition, the primary backward path generation unit 50 and the secondary backward path generation unit 60 may be provided as a single backward path generation unit.

The control unit 70 is an element configured to control each element of the assistant system for a backward driving while being connected to all the elements. The control unit 70 serves to match real-time positions of the vehicle to the secondary backward path and serves to control the steering device manipulation unit according to the secondary backward path which has matched the real-time positions of the vehicle.

As such, a final backward path is generated by using the real-time position information of the vehicle and the obstacle sensing signal, thus the vehicle may drive backward while precisely checking the current position of the vehicle at the time of a backward driving, and therefore, the vehicle may drive without being deviated from the backward path while safely avoiding an obstacle behind the vehicle.

According to a preferred embodiment of the present invention, when a wheel mark left on a road by a vehicle passing the road is present, the obstacle sensing unit 30 may further generate a wheel mark sensing signal by sensing the wheel mark.

In this case, the secondary backward path generation unit 60 may generate a secondary backward path based on the obstacle sensing signal and the wheel mark sensing signal. The wheel mark represents a mark generated by a wheel of a vehicle when vehicles repeatedly pass along a country road or mountain road that is unpaved, for example, a dirt road that is recessed by a predetermined width due to a wheel of a vehicle or a region of a grass road which has a predetermined width and in which grass are not grown due to a wheel of a vehicle.

As such, the obstacle sensing unit 30 may sense such a mark on a road formed by a predetermined width due to a wheel on the basis of image information about a rear view obtained through the image collecting unit.

Additionally, when a backward driving assistant command is input through the input unit 10, the control unit 70 is configured to, before controlling the steering device manipulation unit 40, determine whether the vehicle satisfies a vehicle state criterion for performing a backward operation and determine whether the vehicle allows a backward driving to be performed based on the obstacle sensing signal.

In more detail, the control unit 70 determines that the vehicle state criterion is satisfied when the vehicle is stopped by a brake operation of a driver (that is, when the vehicle speed is '0') under the condition that a shift lever is in a position of a reverse gear (R) of the vehicle.

Also, it is determined whether the vehicle allows a backward driving to be performed by detecting obstacles existing at left and right sides of the vehicle with respect to a backward driving direction of the vehicle on the basis of image information and position information of the obstacle sensing signal, and comparing a minimum lateral gap between the obstacles with a crosswise width of the vehicle. Although not shown, the control unit 70 may use a shift lever sensor for sensing gear state information of a shift lever and a brake sensor for sensing a stationary state of a vehicle or a speed sensor for sensing wheel rotation of a vehicle.

Meanwhile, the assistant system for a backward driving of a vehicle according to the embodiment of the present invention may selectively further include a drive trace storage unit 80, a vehicle internal information detection unit 90, and an output unit 100.

The drive trace storage unit 80 is an element configured to store a movement trace according to real-time positions of the vehicle tracked by the position tracking unit 20. In this case, the primary backward path generation unit 50 may generate a primary backward path based on spatial coordinates corresponding to a movement trace in a forward direction at the time of generating the primary backward path. Accordingly, when a vehicle enters a wrong road and thus need to drive backward along a path used by the vehicle, the primary backward path generation unit 50 may generate a primary backward path to suit an intention of the driver even when a junction of a plurality of branches is present in the backward path.

In addition, the vehicle internal information detection unit 90 is an element configured to detect vehicle internal information including turning direction information of a vehicle body with respect to a driving direction, steering angle information, and rotation speed information of a wheel.

In the control of the steering device manipulation unit 40 according to the secondary backward path, the control unit 70 may control the steering device manipulation unit 40 such that a steering angle of the steering device is adjusted to correspond to a dynamic movement occurring at the time of a backward driving of the vehicle using the vehicle internal information.

The vehicle internal information detection unit 90 may include a rotation rate sensor for obtaining a rotational direction information of a vehicle body, a steering angle sensor for obtaining steering angle information, and a speed sensor for obtaining rotation speed information of each vehicle. Accordingly, the control unit 70 may adjust the steering angle of the steering device to suit a reverse speed even when the reverse speed is changed by a driver using a brake or an accelerator pedal.

With respect to a movement trace of a vehicle, a vehicle has a forward steering path and a backward steering path different from each other when driving the same path.

For example, assuming that obstacles are present at the left and right sides of a curved region of a "S" shaped path, in the case of a forward driving of the "S" shaped path, when a front side of the vehicle moves to avoid the obstacles with front wheels being rotated along the path, a turn center is formed in a region in which a direction perpendicular to a travel direction of the rotating front wheels meets a direction perpendicular to a travel direction of rear wheels.

Accordingly, in order to drive the "S" shaped path while avoiding the obstacles, steering paths need to be formed so that turn centers of the vehicle gather at the obstacle and the center with respect to a radius of the "S" shaped path.

Since the turn center of the vehicle is closer to the rear side of the vehicle than the front side of the vehicle, the steering path need to be formed in consideration that the turning radius of the vehicle in a forward driving is larger than that in a backward driving, and thus, the vehicle may collide with an obstacle formed at an outer side of the center of the radius of the turning path of the vehicle.

On the other hand, with regard to a backward driving of the "S" shaped path, since the turn center of the vehicle is formed closer to the rear side of the vehicle rather than the front side of the vehicle, the steering path may be formed so that the rear side of the vehicle is adjacent to the obstacles at the time of passing through between the obstacles along the "S" shaped path. Accordingly, in the backward driving, a free steering path having a turning radius smaller than that of a forward driving is formed.

At the time of the forward driving and the backward driving, a rotation angle $\Phi_1$ of the front wheels and a shift angle $\Phi_2$ of the rear wheels according to rotation of the front wheels are represented by the following relation.

$$\Phi_1 = \alpha \times \Phi_2 \qquad \text{Forward driving:}$$

$$\Phi_1 = -\Phi_2 \qquad \text{Backward driving:}$$

By using the above relation, coordinates of a movement trace of a vehicle moved when the front wheels of the vehicle are rotated at the time of the forward driving and the backward driving are represented below.

Forward movement trace coordinates $$(X, Y) = \left( R_3 \sin\left(\frac{1}{\alpha} \times \Phi_1\right), R_3 \cos\left(\frac{1}{\alpha} \times \Phi_1\right) \right)$$

Backward movement trace coordinates $(X,Y)=(R_3 \sin(-\Phi_1), R_3 \cos(-\Phi_1))$ Herein, when R3 represents a vector of final movement with respect to a position of the vehicle desired to be moved, $\Phi_1$ is a rotation angle of the front wheel, and $\Phi_2$ is a shift angle of the rear wheel according to rotation of the front wheel, a represents $\Phi_1/\Phi_2$ at the time of a forward movement.

Accordingly, the present invention is characterized in controlling the steering device manipulation unit such that the steering angle of the steering device is adjusted to suit a dynamic movement corresponding to a backward driving according to the secondary path.

The output unit 100 is an element configured to output at least one of information indicating whether the vehicle state criterion is satisfied, information indicating whether a backward driving is performable, obstacle sensing signal information, and driver guidance information. The output unit 100 may display each piece of information in a predetermined format through a display device (for example, a monitor) or may provide each piece of information in the form of a voice guidance using a predetermined statement through a voice output unit.

The driver guidance information represents guidance information for performing an established process at the time of a backward driving and may include a braking message or an alert message for each situation.

In addition, the output unit 100 may further display the current position of the vehicle on the map information such that the driver identifies the current position of the vehicle together with the primary backward path and the secondary backward path through the display device. Alternatively, the output unit 100 may further display image information obtained by the rear camera through the display device.

Meanwhile, the control unit 70 is configured to, when the secondary backward path is generated and stored in the storage unit, determine whether a steering angle of the steering device is automatically adjustable by the steering device manipulation unit 40 at the time of a backward driving in real time.

The determination of whether the steering angle is automatically adjustable may include determining the steering angle according to the secondary backward path in real time and determining the steering angle of the steering device to be automatically adjustable when satisfying all conditions including a vehicle speed with respect to the steering angle of the steering wheel that is a predetermined speed or below (e.g., 10 kph or below), a steering wheel torque sensor value that is a reference value or below (e.g., 3 Nm@20 ms or below), and an engine rpm within a reference range (e.g., 500<rpm<2000).

When all the conditions are not satisfied, the control unit 70 may output a message informing that the automatic steering is not possible through the output unit 100.

Also, when the steering device manipulation unit is controlled according to the secondary backward path, the control unit 70 may perform an emergency stop on the vehicle by controlling a braking device of the vehicle (e.g., a brake) when the vehicle on drive may not avoid an obstacle which abruptly approaches the vehicle within the secondary backward path, or when the vehicle may no longer drive backward due to a gap between obstacles getting narrow.

To this end, the assistant system for a backward driving of a vehicle according to the embodiment of the present invention may be additionally provided with a braking device driving unit (not shown) for automatically controlling the braking device such that the braking device is subject to an emergency braking according to the control of the control unit 70 instead of a manipulation of the driver.

In addition, upon occurrence of an emergency braking situation, the control unit 70 may notify the driver of the emergency braking situation through the output unit 100. In addition, the control unit 70 may output different alarm sounds according to distances to an obstacle within a predetermined distance to notify that the driver is approaching the obstacle.

As such, the steering of the vehicle is automatically controlled by the assistant system for a backward driving of a vehicle according to the embodiment of the present invention, and thus the driver can safely and conveniently drive backward by only manipulating the accelerator pedal and the brake. In addition, even when the vehicle rapidly approaches an obstacle or has difficulties in avoiding the obstacle, the vehicle is automatically and rapidly braked by the assistant system for a backward driving of a vehicle according to the embodiment of the present invention, and thus increased safety is secured.

Figure 3:
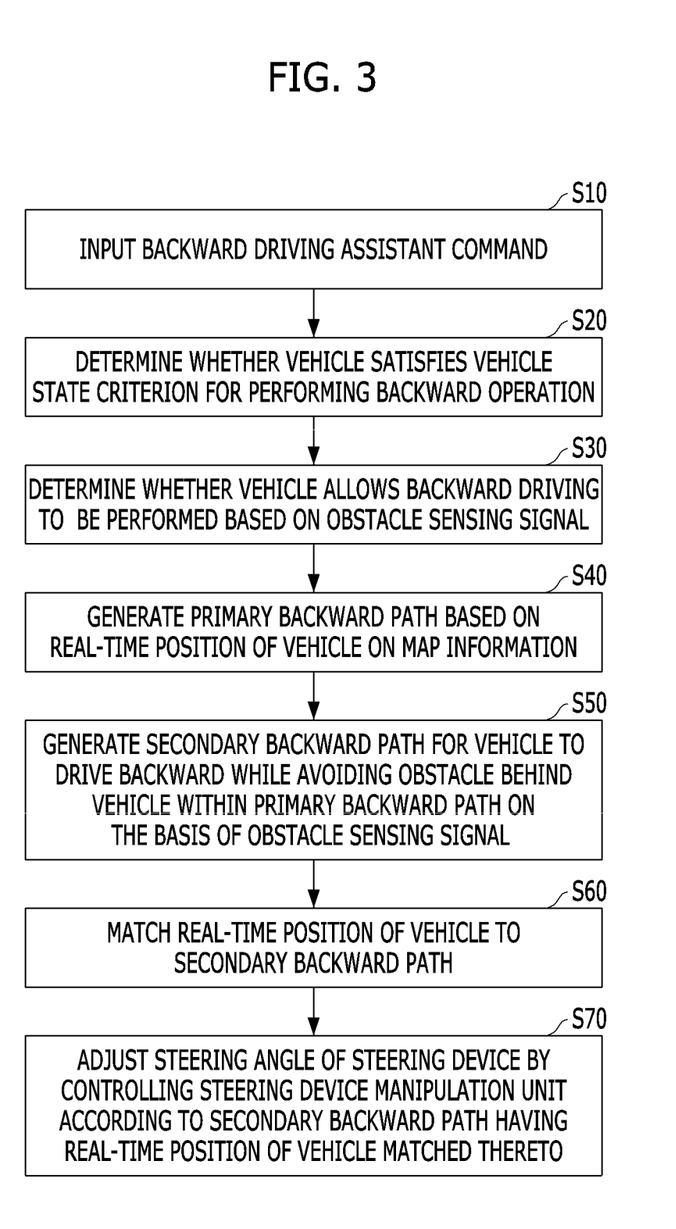
FIG. 3 is a flowchart showing an operation of an assistant system for a backward driving of a vehicle according to an embodiment of the present invention.

Hereinafter, an assistant method of a backward driving of a vehicle according to the present invention will be described with reference to FIG. 3. FIG. 3 is a flowchart showing an operation of an assistant system for a backward driving of a vehicle according to an embodiment of the present invention.

As show in FIG. 3, the assistant method of a backward driving of a vehicle according to the embodiment of the present invention includes receiving a backward driving assistant command through the input unit 10 from a driver (S10), and then determining, by the control unit 70, whether the vehicle satisfies a vehicle state criterion for performing a backward operation (S20).

For example, in the determining of whether the vehicle state criterion is satisfied, the vehicle state criterion is determined to be satisfied when the vehicle is brought to a stationary state by a brake operation of the driver under the condition that a shift lever is in the position of a reverse gear (R).

When the shift lever is not in the position of the reverse gear (R) or the vehicle is on the move, the driver is notified through the output unit 100 that the shift lever is not in the position of the reverse gear (R) or the vehicle is on the move.

Sequentially, when it is determined that the vehicle state criterion is satisfied, the control unit 70 determines whether the vehicle allows a backward driving to be performed based on an obstacle sensing signal (S30).

For example, in the determination of whether the vehicle allows a backward driving to be performed, it is determined whether the vehicle allows the backward driving to be performed by detecting obstacles existing at the left and right sides of the vehicle with respect to a backward driving direction of the vehicle on the basis of image information and position information of the obstacle sensing signal, and comparing a minimum lateral gap between the obstacles with a crosswise width of the vehicle.

When the vehicle is determined not to be able to perform a backward driving, the driver is notified through the output unit 100 that the vehicle is determined not to be able to perform the backward driving.

Sequentially, the primary backward path generation unit 50 generates a primary backward path based on real-time positions of the vehicle on map information that is previously stored (S40). In this case, in the generation of the primary backward path, the primary backward path generation unit 50 may generate the primary backward path to correspond to a movement trace in a forward direction at the time of generating the primary backward path.

Sequentially, the secondary backward path generation unit 60 generates a secondary backward path for the vehicle to drive backward while avoiding an obstacle behind the vehicle within the primary backward path on the basis of the obstacle sensing signal (S50).

In this case, the secondary backward path generation unit 60 may update the secondary backward path periodically or at equal intervals according to an obstacle sensing signal that is newly sensed at the time of a backward driving of the vehicle.

Sequentially, the control unit 70 matches the real-time positions of the vehicle to the secondary backward path (S60), and adjusts the steering angle of the steering device by controlling the steering device manipulation unit 40 according to the secondary backward path which has matched the real-time positions of the vehicle (S70).

In this case, the control unit 70 may control the steering device manipulation unit 40 such that the steering angle of the steering device is adjusted to suit a reverse speed of the vehicle using vehicle internal information including turning direction information of a vehicle body with respect to a backward driving direction, steering angle information, and rotation speed information of a wheel.

As is from the above, according to the present invention, since a final backward path is generated using the real-time position information of the vehicle and a obstacle sensing signal, the vehicle can drive backward while precisely checking a current position thereof at the time of a backward driving so that the vehicle can drive safely while avoiding an obstacle behind the vehicle without being deviated from the backward path.

Although it is described above that all components constituting an embodiment of the present invention are combined into one component or operate in combination, the present invention is limited to the described embodiment. In other words, two or more components constituting the embodiment can be selectively combined or operate in combination as long as such combination is within the scope of the present invention. Although each of all components can be implemented as one individual piece of hardware, some or all of the components can be selectively combined to be implemented as a computer program having a program module that performs the combined some or all functions in one or more pieces of hardware. Further, an exemplary embodiment can be implemented by having the computer program stored in computer-readable media, such as universal serial bus (USB) memory, a compact disc read only memory (CD-ROM), a flash memory, etc., and read and executed by a computer. The computer-readable media can also include magnetic recording media, optical recording media, carrier wave media, and so on.

Although the present invention has been described above, it should be understood that there is no intent to limit the present invention to the particular forms disclosed, but on the contrary, the disclosure is to cover all modifications, equivalents, and alternatives falling within the spirit and scope of the disclosure. Therefore, the exemplary embodiments disclosed in the present invention and the accompanying drawings are intended not to limit but to illustrate the technical spirit of the present invention. The protective scope of the present invention should be construed on the basis of the accompanying claims and it should be construed that all of the technical ideas included within the scope equivalent to the claims belong thereto.

What is claimed is:

1. An assistant system for a backward driving of a vehicle, the assistant system comprising:
    an input unit of at least one processor configured to receive a backward driving assistant command;
    a position tracking unit of at least one processor configured to track real-time positions of the vehicle;
    an obstacle sensing unit of at least one processor configured to sense an obstacle existing at front, rear, left and right sides of the vehicle and generate an obstacle sensing signal;
    a steering device manipulation unit of at least one processor configured to adjust a steering angle of a steering device of the vehicle;
    a primary backward path generation unit of at least one processor configured to generate a primary backward path based on the real-time positions of the vehicle on map information that is previously stored;
    a secondary backward path generation unit of at least one processor configured to generate a secondary backward path for the vehicle to drive backward while avoiding the obstacle behind the vehicle within the primary backward path based on the obstacle sensing signal; and
    a control unit of at least one processor configured to match the real-time positions of the vehicle to the secondary backward path, and at the time of a backward driving, to control the steering device manipulation unit according to the secondary backward path which matched the real-time positions of the vehicle,
    wherein:
    when a wheel mark left on a road by a different vehicle passing the road is present, the obstacle sensing unit further generates a wheel mark sensing signal by sensing the wheel mark, and the secondary backward path generation unit generates the secondary backward path based on the obstacle sensing signal and the wheel mark sensing signal; and
    the wheel mark includes a recess having a predetermined width on an unpaved road surface or a bare area having a predetermined width on a grass-covered road surface.

2. The assistant system of claim 1, further comprising a drive trace storage unit configured to store a movement trace according to the real-time positions of the vehicle,
    wherein the primary backward path generation unit generates the primary backward path based on spatial coordinates corresponding to a movement trace in a forward direction.

3. The assistant system of claim 1, further comprising a vehicle internal information detection unit configured to detect vehicle internal information including turning direction information of a vehicle body with respect to a driving direction, steering angle information, and rotation speed information of a wheel,
    wherein, in the control of the steering device manipulation unit according to the secondary backward path, the control unit controls the steering device manipulation unit such that a steering angle of the steering device is adjusted to correspond to a dynamic movement occurring at the time of a backward driving of the vehicle using the vehicle internal information.

4. The assistant system of claim 1, wherein when the backward driving assistant command is input through the input unit, the control unit is configured to, before controlling the steering device manipulation unit, determine whether the vehicle satisfies a vehicle state criterion for performing a backward operation and determine whether the vehicle allows the backward driving to be perform based on the obstacle sensing signal.

5. The assistant system of claim 1, wherein the secondary backward path generation unit updates the secondary backward path at equal intervals.

6. The assistant system of claim 4, further comprising an output unit configured to output at least one of information indicating whether the vehicle state criterion is satisfied, information indicating whether the backward driving is performable, obstacle sensing signal information, and driver guidance information.

7. An assistant method of a backward driving of a vehicle, the assistant method comprising:
receiving a backward driving assistant command;
determining whether the vehicle satisfies a vehicle state criterion for performing a backward operation;
determining whether the vehicle allows a backward driving to be performed based on an obstacle sensing signal;
generating a primary backward path based on real-time positions of the vehicle on map information that is previously stored;
generating a secondary backward path based on the obstacle sensing signal to drive backward while avoiding an obstacle behind the vehicle within the primary backward path;
matching the real-time positions of the vehicle to the secondary backward path; and
controlling a steering angle of a steering device by manipulating a steering device manipulation unit at the time of the backward driving according to the secondary backward path which matched the real-time positions of the vehicle,
wherein, when a wheel mark left on a road by a different vehicle passing the road is present:
the assistant method further comprises sensing the wheel mark to generate a wheel mark sensing signal;
the generating of the secondary backward path is based on the obstacle sensing signal and the wheel mark sensing signal; and
the wheel mark includes a recess having a predetermined width on an unpaved road surface or a bare area having a predetermined width on a grass-covered road surface.

8. The assistant method of claim 7, wherein the determining of whether the vehicle satisfies a vehicle state criterion comprises determining whether the vehicle state criterion is satisfied when the vehicle is stopped by a brake manipulation of a driver under a condition that a shift lever is in a position of a reverse gear.

9. The assistant method of claim 7, wherein the determining of whether the vehicle allows the backward driving to be performed based on the obstacle sensing signal comprises determining whether the vehicle allows the backward driving to be performed by detecting obstacles existing at left and right sides of the vehicle with respect to a backward driving direction of the vehicle on the basis of image information and position information of the obstacle sensing signal, and comparing a minimum lateral gap between the obstacles with a crosswise width of the vehicle.

10. The assistant method of claim 7, wherein the generating of the secondary backward path based on the obstacle sensing signal comprises updating the secondary backward path periodically or at equal intervals according to the obstacle sensing signal that is newly sensed at the time of a backward driving of the vehicle.

11. The assistant method of claim 7, wherein the controlling of the steering angle of the steering device comprises controlling the steering device manipulation unit so that the steering angle of the steering device is adjusted to suit a reverse speed of the vehicle using vehicle internal information including turning direction information of a vehicle body with respect to a backward driving direction, steering angle information, and rotation speed information of a wheel.

* * * * *